United States Patent [19]  [11] Patent Number: 5,332,278
Berry  [45] Date of Patent: Jul. 26, 1994

[54] WINDSHIELD PROTECTION APPARATUS

[76] Inventor: William L. Berry, 833 Cottage Rd., Bonne Terre, Mo. 63628

[21] Appl. No.: 96,304

[22] Filed: Jul. 26, 1993

[51] Int. Cl.⁵ ............................ E04H 15/04; B60J 1/20
[52] U.S. Cl. ............................ 296/95.1; 160/370.2 R; 248/122; 135/90
[58] Field of Search ........ 296/95.1; 160/351, 370.2 R, 160/DIG. 2, DIG. 3; 52/143; 248/122, 124, 910; 135/90, 88, 87

[56] References Cited

U.S. PATENT DOCUMENTS

| | | | |
|---|---|---|---|
| 2,869,562 | 1/1959 | Francis | 160/370.2 R X |
| 3,004,301 | 10/1961 | Francis | 160/370.2 R X |
| 3,031,086 | 4/1962 | Blair | 248/122 X |
| 3,032,045 | 5/1962 | Francis | 135/90 |
| 3,295,473 | 1/1967 | Wentworth | 248/122 X |
| 3,650,559 | 3/1972 | Powers | 160/160.2 R X |
| 4,821,785 | 4/1989 | Rolan | 160/370.2 X |
| 4,976,487 | 12/1990 | Ramos et al. | 160/370.2 R X |
| 5,123,468 | 6/1992 | Mater, Jr. | 296/95.1 X |

Primary Examiner—Joseph D. Pape

[57] ABSTRACT

A new and improved windshield protection apparatus includes a ground-supported base. A height adjusting assembly is connected to the ground-supported base. A transverse support assembly is connected to the height adjusting assembly. A windshield-contacting protective member is connected to the transverse support assembly, and a tilt adjustment assembly is connected to the windshield-contacting protective member, for adjusting a tilt of the windshield-contacting protective member with respect to an automobile windshield. The windshield protection apparatus is supported independently of the automobile. The windshield-contacting protective member includes a contour that is complementary to a contour of the automobile windshield. The windshield-contacting protective member is rigidly attached to the transverse support assembly, and the transverse support assembly is attached to the height adjusting assembly with a swivel connection. The ground-supported base may include a hollow interior chamber defined by a housing. The housing includes a filler aperture and a cap for the filler aperture. The hollow interior chamber contains a quantity of a ballast material for weighing down the ground-supported base. To use the apparatus, an automobile is driven toward the apparatus so the automobile windshield comes into contact with the independently supported windshield-contacting protective member. To separate from the windshield-contacting protective member 18, the automobile is merely driven in reverse.

17 Claims, 4 Drawing Sheets

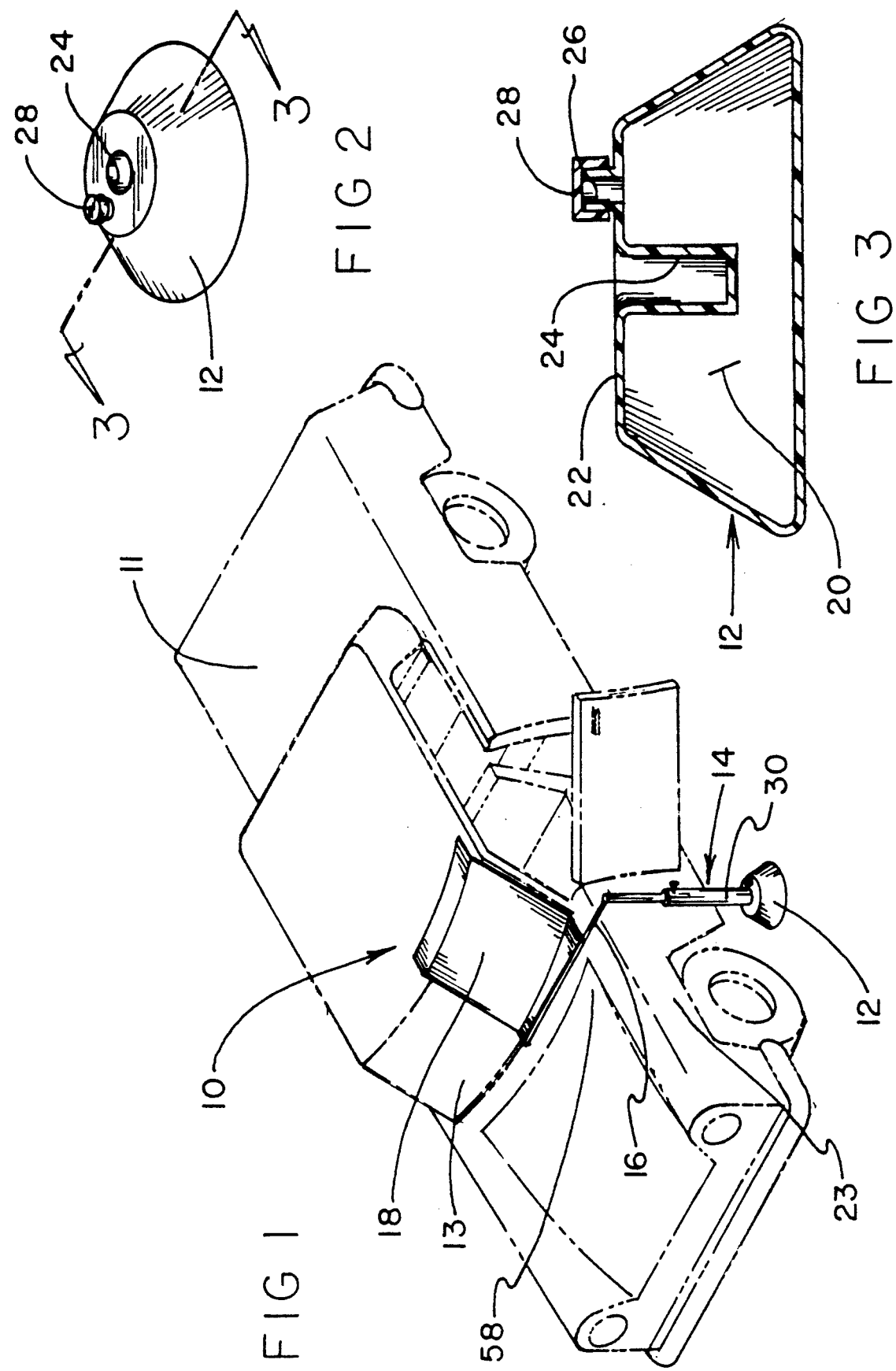

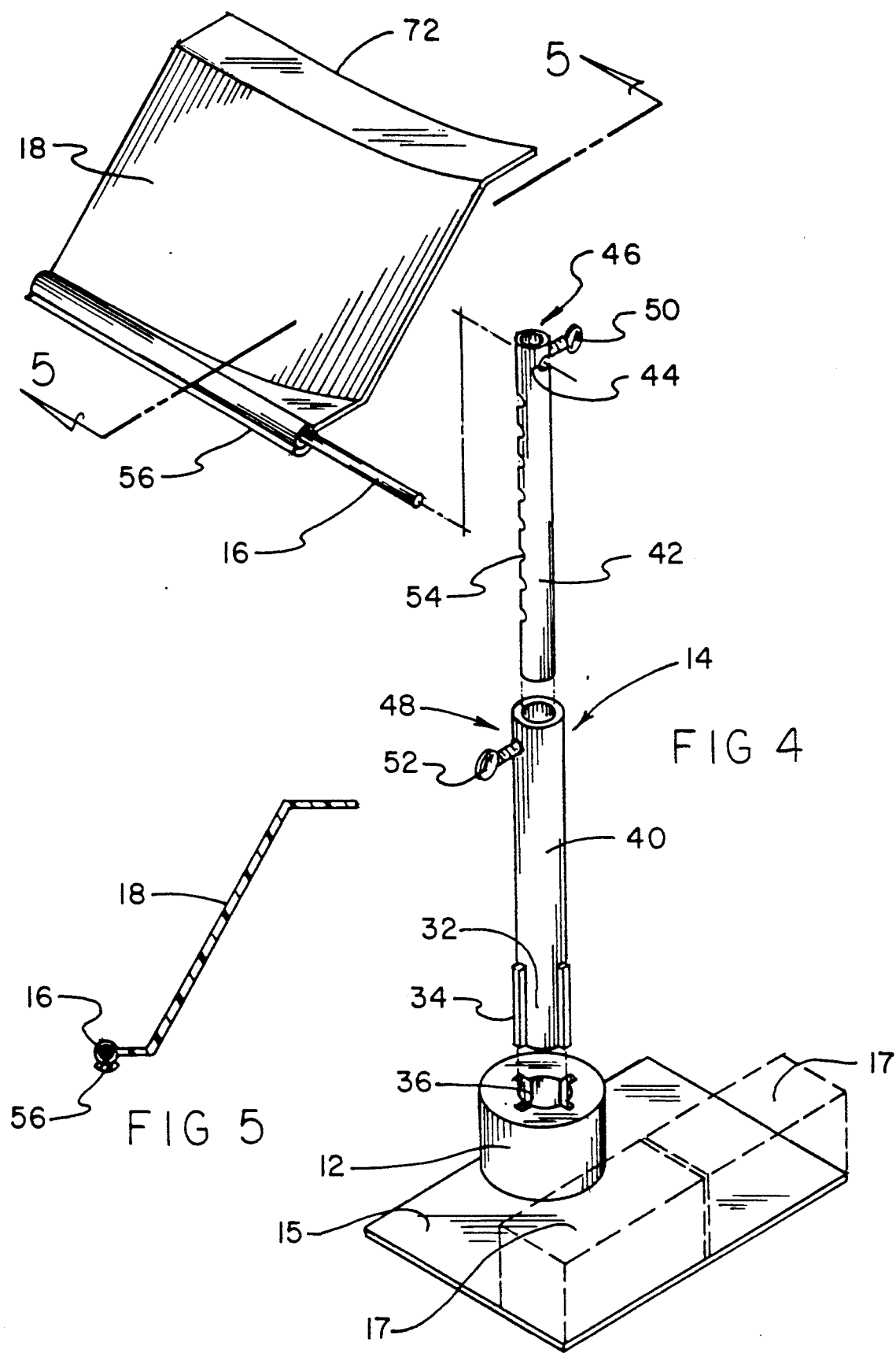

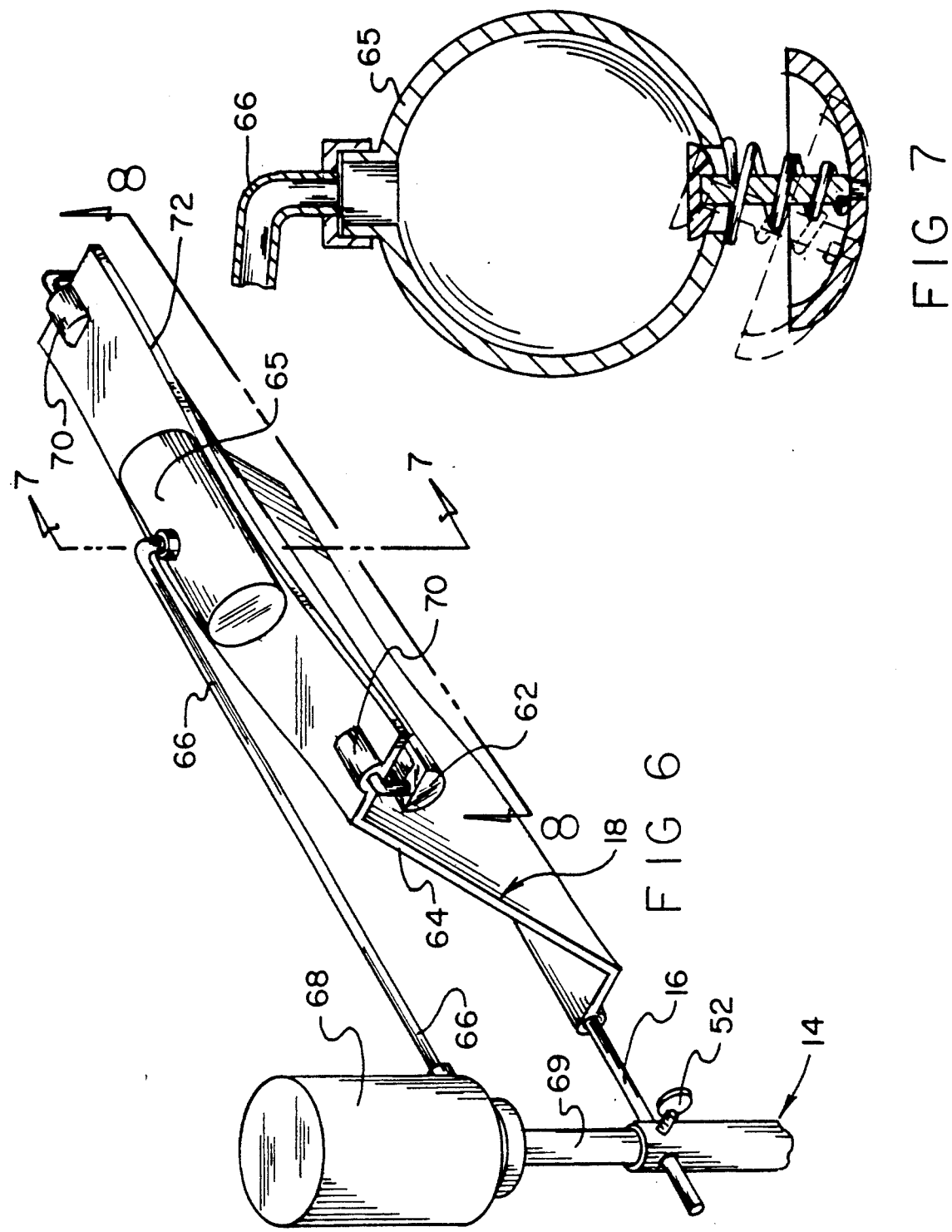

WINDSHIELD PROTECTION APPARATUS

BACKGROUND OF THE INVENTION

1. Field of the Invention

The present invention relates generally to devices for protecting an automobile from precipitation, and more particularly, to devices especially adapted for protecting a windshield.

2. Description of the Prior Art

Devices for protecting automobiles from precipitation such as snow, sleet, freezing rain, and the like are well known in the art. More specifically, throughout the years, a number of innovations have been developed for protecting windshields from precipitation. The following U.S. patents are representative of some of those innovations: U.S. Pat. Nos. 4,131,269; 4,848,825; 4,903,749; 5,014,758; and 5,037,156. All of these patented devices share a common characteristic, and that is the devices are supported by the automobile when the devices are used. Because the devices are supported by the automobile, the devices must be manually removed from the automobile when the driver is about to drive the automobile. The requirement that the device be manually removed from the automobile can be a great inconvenience. This is especially true on cold, snowy days. In this respect, it would be desirable if a windshield protective device were provided which did not need to be manually removed from the automobile when the automobile was about to be driven.

Another disadvantage of the patented devices mentioned above is that the devices must be manually placed over the windshield when the device is used. This is another inconvenience. In this respect, it would be desirable if a windshield protective device were provided that did not have to be manually placed over the windshield in order to use the device.

Still another disadvantage of the above-mentioned patented devices is that, generally, the devices are carried in the automobile when the devices are not in use. As such they take up space in either the passenger compartment or the trunk which may be preferably reserved for other items. In this respect, it would be desirable if a windshield protective device were provided that is not carried and stored in the automobile when the windshield protective device is not in use.

Another method of protecting a windshield is to manually place a piece of cardboard over the windshield prior to exposure of the windshield to precipitation. This technique suffers from the disadvantages mentioned above relating to carriage and storage of manually placed windshield protective devices.

The windshield protective devices mentioned above share another common characteristic. The do not remove accumulated precipitation from the windshield. To remove the accumulated precipitation, the person who is about to drive must manually remove the accumulated precipitation from the windshield protective device. In this respect, it would be desirable if a windshield protective device were provided which did not require manual removal of accumulated precipitation from the protective device.

When precipitation accumulates on the windshield protective device, precipitation also accumulates on the hood of the automobile in front of the windshield. Often it is desirable to remove accumulated precipitation from the hood of the automobile in front of the windshield. If this is not done, oftentimes the accumulated precipitation that is present on the hood blows onto the windshield when the automobile moves forward. Generally, the removal of the accumulated precipitation from the automobile hood must be done manually. In this respect, it would be desirable if a windshield protective device were provided that automatically removed some accumulated precipitation from the hood of the automobile when the windshield protective device was removed from the windshield.

Another problem associated with conventional windshield protective devices is that when the devices are manually removed from the automobile windshield, they are often wet or moisture laden. Yet they must be somehow folded to reduce their size for storage. Being wet and being folded, it is very difficult for them to dry out adequately. As such, they may get moldy and be susceptible to rotting. In this respect, it would be desirable if a windshield protective device were provided that were not folded when not in use and that was adequately exposed to air to allow the device to dry out.

There are still other features that would be desirable in an automobile windshield protective device. Automobiles come in many shapes and sizes. The same can be said of automobile windshields. In this respect, it would be desirable if a windshield protective device were provided that were capable of being adapted to many different windshields on many different automobiles.

There may be times when a person opts not to use an automobile windshield protective device. This may be especially so in clear dry weather. Yet during these times when the automobile windshield protective device is not used, it would also be desirable, as stated above, that the unused device need not be carried and stored in the automobile. Therefore, it would also be desirable if an automobile windshield protective device were provided that, at one's option, need not be used, and when not used, would not occupied storage space in the automobile.

During cold times, an automobile windshield protective device may not be one hundred percent effective, and ice may form on a windshield under the protective device. In this respect, it would be desirable if a windshield protective device were provided that dispensed an ice melting liquid underneath the protective device. Moreover, when an ice melting, or de-icing, composition would be applied to a windshield under a windshield protective device, it would be desirable if the de-icing composition would be distributed evenly over the windshield.

Thus, while the foregoing body of prior art indicates it to be well known to use protective devices for automobile windshield, the prior art described above does not teach or suggest a windshield protection apparatus which has the following combination of desirable features: (1) does not need to be manually removed from the automobile when the automobile is about to be driven; (2) does not have to be manually placed over the windshield in order to use the device; (3) is not carried and stored in the automobile when the windshield protective device is not in use; (4) does not require manual removal of accumulated precipitation from the protective device; (5) automatically removes some accumulated precipitation from the hood of the automobile when the windshield protective device is removed from the windshield; (6) is not folded up when not in use and is adequately exposed to air to allow the device to dry out after use; (7) is capable of being adapted to many different windshields on many different automobiles; (8) at one's option, need not be used, and when not used, does not occupy storage space in the automobile; (9) dispenses an ice melting liquid underneath the protective device; and (10) distributes the de-icing composition evenly over the windshield. The foregoing desired characteristics are provided by the unique windshield protection apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved windshield protection apparatus which includes a ground-supported base. A height adjusting assembly is connected to the ground-supported base. A transverse support assembly is connected to the height adjusting assembly. A windshield-contacting protective member is connected to the transverse support assembly, and a tilt adjustment assembly is connected to the windshield-contacting protective member, for adjusting a tilt of the windshield-contacting protective member with respect to an automobile windshield. The windshield-contacting protective member includes a contour that is complementary to a contour of the automobile windshield.

The windshield-contacting protective member is rigidly attached to the transverse support assembly, and the transverse support assembly is attached to the height adjusting assembly with a swivel connection.

The ground-supported base includes a hollow interior chamber defined by a housing. The housing includes a filler aperture and a cap for the filler aperture. The hollow interior chamber contains a quantity of a ballast material.

The ground-supported base includes a receiving portion for receiving the height adjusting assembly. The receiving portion defines a cylindrical well for receiving a complementary cylindrical bottom portion of the height adjusting assembly, such that the height adjusting assembly is capable of adjustably swivelling in the ground-supported base.

A bottom portion of the height adjusting assembly includes a plurality of key elements which fit into complementary key-receiving slots in the ground-supported base.

The height adjusting assembly includes a first telescopic member supported by the ground-supported base. A second telescopic member is telescopically received in the first telescopic member. The second telescopic member includes apertures for receiving the transverse support assembly. The second telescopic member also includes a first locking assembly for locking the transverse support assembly and the windshield-contacting protective member at a tilt. A second locking assembly locks the second telescopic member at a predetermined height adjustment with respect to the first telescopic member.

A resilient wiper member is connected to a bottom portion of the windshield-contacting protective member, such that the resilient wiper member wipes against a hood of an automobile when the automobile is driven in reverse away from the windshield-contacting protective member, such that the windshield-contacting protective member is capable scraping some accumulated precipitation, e.g. snow, off of the hood of the automobile.

A liquid distribution assembly is connected to the windshield-contacting protective member, for distributing a quantity of a liquid onto the automobile windshield. The liquid distribution assembly contains and distributes a quantity of liquid that may serve as a de-icer solution.

The liquid distribution assembly includes a liquid distribution element which is connected to the windshield-contacting protective member at a location near a top of the windshield-contacting protective member and between the windshield-contacting protective member and the automobile windshield. A liquid supply assembly supplies liquid to the liquid distribution element. The liquid distribution element includes a plurality of distribution apertures. The distribution apertures are arranged in a linear array in the liquid distribution element. The liquid supply assembly includes a first tank located over the liquid distribution element for supplying liquid to the liquid distribution element by gravity feed. A hose is connected to the first tank. The hose supplies liquid to the first tank, and a second tank is connected to the hose. The second tank supplies liquid to the hose. The second tank is supported by the height adjusting assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved windshield protection apparatus which has all of the advantages of the prior art and none of the disadvantages.

It is another object of the present invention to provide a new and improved windshield protection apparatus which may be easily and efficiently manufactured and marketed.

It is a further object of the present invention to provide a new and improved windshield protection apparatus which is of durable and reliable construction.

An even further object of the present invention is to provide a new and improved windshield protection apparatus which is susceptible of a low cost of manufacture with regard to both materials and labor, and which accordingly is then susceptible of low prices of sale to the consuming public, thereby making such windshield protection apparatus available to the buying public.

Still yet a further object of the present invention is to provide a new and improved windshield protection apparatus which does not need to be manually removed from the automobile when the automobile is about to be driven.

Still another object of the present invention is to provide a new and improved windshield protection apparatus that does not have to be manually placed over the windshield in order to use the device.

Yet another object of the present invention is to provide a new and improved windshield protection apparatus which is not carried and stored in the automobile when the windshield protective device is not in use.

Even another object of the present invention is to provide a new and improved windshield protection apparatus that does not require manual removal of accumulated precipitation from the protective device.

Still a further object of the present invention is to provide a new and improved windshield protection apparatus which automatically removes some accumulated precipitation from the hood of the automobile when the windshield protective device is removed from the windshield.

Yet another object of the present invention is to provide a new and improved windshield protection apparatus that is not folded up when not in use and is adequately exposed to air to allow the device to dry out after use.

Still a further object of the present invention is to provide a new and improved windshield protection apparatus which is capable of being adapted to many different windshields on many different automobiles.

Yet another object of the present invention is to provide a new and improved windshield protection apparatus that, at one's option, need not be used, and when not used, does not occupy storage space in the automobile.

Still a further object of the present invention is to provide a new and improved windshield protection apparatus that dispenses an ice melting liquid underneath the protective device.

Yet another object of the present invention is to provide a new and improved windshield protection apparatus which distributes the de-icing composition evenly over the windshield.

These together with still other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first preferred embodiment of the windshield protection apparatus of the invention in use protecting an automobile windshield.

FIG. 2 is an enlarged perspective view of the ground-contacting, swivel-providing base member of the embodiment of the invention shown in FIG. 1.

FIG. 3 is an enlarged cross-sectional view of the ground-contacting, swivel-providing base member shown in FIG. 2 taken along the line 3—3 thereof.

FIG. 4 is partially exploded perspective view of a second preferred embodiment of the invention which includes a ground-contacting base member that does not include a swivel.

FIG. 5 is a cross-sectional view of the windshield-contacting member of FIG. 4 taken along the line 5—5 thereof.

FIG. 6 is a partial perspective view of a third embodiment of the windshield protection apparatus of the invention which includes a dispenser for dispensing a de-icing solution under the windshield-contacting member.

FIG. 7 is an enlarged cross-sectional view of the embodiment of the invention shown in FIG. 6 taken along the line 7—7 thereof.

DESCRIPTION OF THE PREFERRED EMBODIMENT

Figure 8:
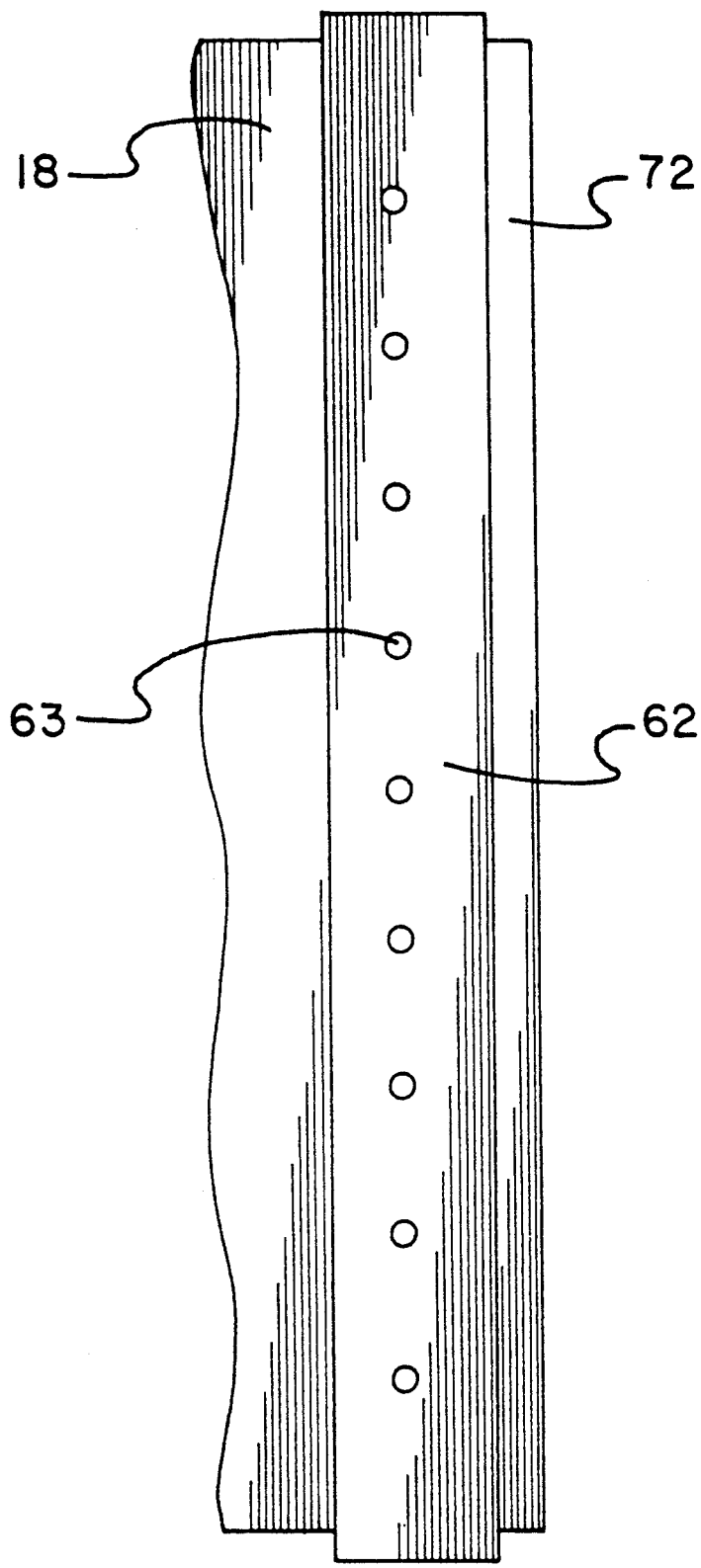
FIG. 8 is a bottom view of the embodiment of the invention shown in FIG. 7 which discloses a series of evenly distributed dispensing apertures for dispensing the de-icing solution evenly.

With reference to the drawings, a new and improved windshield protection apparatus embodying the principles and concepts of the present invention will be described.

Turning initially to FIGS. 1–3, there is shown a first exemplary embodiment of the windshield protection apparatus of the invention generally designated by reference numeral 10. In its preferred form, windshield protection apparatus 10 includes a ground-supported base 12. A height adjusting assembly 14 is connected to the ground-supported base 12. A transverse support assembly 16 is connected to the height adjusting assembly 14. A windshield-contacting protective member 18 is connected to the transverse support assembly 16, and a tilt adjustment assembly is connected to the windshield-contacting protective member 18, for adjusting a tilt of the windshield-contacting protective member 18 with respect to an automobile windshield 13. The windshield-contacting protective member 18 includes a contour that is complementary to a contour of the automobile windshield 13. The windshield-contacting protective member 18 may be made from a relatively soft, flexible plastic or rubber material.

As shown in FIG. 4, the windshield-contacting protective member 18 is rigidly attached to the transverse support assembly 16, and the transverse support assembly 16 is attached to the height adjusting assembly 14 with a swivel connection 21.

The windshield protection apparatus 10 is supported independently of the automobile 11 and is used with an automobile 11 for protecting a portion of the automobile windshield 13. In operation, the windshield protection apparatus 10 of the invention is first adjusted with respect to height and tilt of the windshield-contacting protective member 18 for a particular automobile and its windshield so that the particular automobile 11 can be driven up to the windshield-contacting protective member 18, so that the windshield-contacting protective member 18 covers a portion of the windshield 13 of the automobile 11. In this way, the automobile windshield 13 is protected from precipitation by the independently supported windshield-contacting protective member 18.

Conversely, when the automobile 11 is to be driven away from the apparatus of the invention, the automobile 11 is first driven in reverse to back the automobile 11 away from the independently supported windshield-contacting protective member 18. In the course of backing the automobile 11 away from the windshield-contacting protective member 18, accumulated precipitation, e.g. snow, that is present on the windshield-contacting protective member 18 is separated from the automobile windshield 13. In addition, as the automobile 11 is backed away from the windshield-contacting protective member 18, the windshield-contacting protective member 18 serves to scrape some of the accumulated precipitation off of the hood 58 of the automobile 11.

The ground-supported base 12 may includes a number of variations. For example, a wall of a building could be used to support the transverse support assembly 16 of the invention. In this respect, the wall of the building serves as a ground-supported base 12 and a height adjusting assembly 14. Similarly, a post that is driven into the ground may be used to support the transverse support assembly 16 of the invention. Similarly, the post driven into the ground serves as a height adjusting assembly 14 and as a ground-supported base 12.

As shown more specifically in FIG. 3, the ground-supported base 12 includes a hollow interior chamber 20 defined by a housing 22. The housing 22 includes a filler aperture 26 and a cap 28 for the filler aperture 26. The hollow interior chamber 20 contains a quantity of a ballast material. The ballast material may be selected from the group consisting of sand and water.

The ground-supported base 12 includes a receiving portion 24 for receiving the height adjusting assembly 14. The receiving portion 24 defines a cylindrical well for receiving a complementary cylindrical bottom portion 30 of the height adjusting assembly 14, such that the height adjusting assembly 14 is capable of adjustably swivelling in the ground-supported base 12. The swivel action between the height adjusting assembly 14 and the ground-supported base 12 permits the windshield-contacting protective member 18 to either be readily swung into a position parallel to the windshield 13, such as shown in FIG. 1 for contacting a windshield 13, or, alternatively, to be swung away ninety degrees into a position where the windshield-contacting protective member 18 is oriented perpendicular to the windshield 13, or, in other words, parallel to the side 23 of the automobile 11 (this position not shown).

Turning to FIGS. 4-5, a second embodiment of the invention is shown. Reference numerals are shown that correspond to like reference numerals that designate like elements shown in the other figures. In addition, a bottom portion 32 of the height adjusting assembly 14 includes a plurality of key elements 34 which fit into complementary key-receiving slots 36 in the ground-supported base 12. With this embodiment of the invention, the height adjusting assembly 14 cannot be swivelled in the ground-supported base 12. In addition, in this embodiment, the ground-supported base 12 includes a base plate 15 and ballast weights such as bricks 17 placed on the base plate 15.

The height adjusting assembly 14 includes a first telescopic member 40 supported by the ground-supported base 12. A second telescopic member 42 is telescopically received in the first telescopic member 40. The second telescopic member 42 includes apertures 44 for receiving the transverse support assembly 16. The second telescopic member 42 also includes a first locking assembly 46 for locking the transverse support assembly 16 and the windshield-contacting protective member 18 at a predetermined tilt. A second locking assembly 48 locks the second telescopic member 42 at a predetermined height adjustment with respect to the first telescopic member 40.

The first locking assembly 46 includes a first thumb screw 50 that engages complementary threads in the second telescopic member 42. The second locking assembly 48 includes a second thumb screw 52 that engages complementary threads in the first telescopic member 40. The second telescopic member 42 includes height adjustment notches 54.

As shown in FIG. 5, a resilient wiper member 56 is connected to a bottom portion of the windshield-contacting protective member 18, such that the resilient wiper member 56 wipes against a hood 58 of an automobile 11 when the automobile 11 is driven in reverse away from the windshield-contacting protective member 18, such that the windshield-contacting protective member 18 is capable of scraping some accumulated precipitation, e.g. snow, off of the hood 58 of the automobile 11. The resilient wiper member 56 can be made from a flexible, durable foam material.

Turning to FIGS. 6-8, a third embodiment of the invention is shown. Reference numerals are shown that correspond to like reference numerals that designate like elements shown in the other figures. In addition, a, a liquid distribution assembly is connected to the windshield-contacting protective member 18, for distributing a quantity of a liquid onto the automobile windshield 13. The liquid distribution assembly contains and distributes a quantity of liquid that may serve as a de-icer solution.

The liquid distribution assembly includes a liquid distribution element 62 which is connected to the windshield-contacting protective member 18 at a location near a top 64 of the windshield-contacting protective member 18 and between the windshield-contacting protective member 18 and the automobile windshield 13. A liquid supply assembly supplies liquid to the liquid distribution element 62. The liquid distribution element 62 includes a plurality of distribution apertures 63. The distribution apertures 63 are arranged in a linear array in the liquid distribution element 62. In the linear array of distribution aperture 63, the apertures 63 are evenly spaced from each other to provide an even distribution of liquid onto the automobile windshield 13. The liquid supply assembly includes a first tank 65 located over the liquid distribution element 62 for supplying liquid to the liquid distribution element 62 by gravity feed. A hose 66 is connected to the first tank 65. The hose 66 supplies liquid to the first tank 65, and a second tank 68 is connected to the hose 66. The second tank 68 supplies liquid to the hose 66.

The second tank 68 is supported by the height adjusting assembly 14 on vertical support rod 69. The liquid distribution element 62 is connected to the windshield-contacting protective member 18 by spring biased hinge assemblies 70. The first tank 65 and the hinge assemblies 70 are supported by a horizontally extending portion 72 of the windshield-contacting protective member 18.

The components of the windshield protection apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved windshield protection apparatus that is low in cost, relatively simple in design and operation, and which may advantageously be used to protect an automobile windshield without needing to be manually removed from the automobile when the automobile is about to be driven. With the invention, a windshield protection apparatus is provided which does not have to be manually placed over the windshield in order to use the device. With the invention, a windshield protection apparatus is provided which is not carried and stored in the automobile when the windshield protective device is not in use. With the invention, a windshield protection apparatus is provided which does not require manual removal of accumulated precipitation from the protective device. With the invention, a windshield protection apparatus is provided which automatically removes some accumulated precipitation from the hood of the automobile when the windshield protective device is removed from the windshield. With the invention, a windshield protection apparatus is provided which is not folded up when not in use and is adequately exposed to air to allow the device to dry out after use. With the invention, a windshield protection apparatus is provided which is capable of being adapted to many different windshields on many different automobiles. With the invention, a windshield protection apparatus is provided which, at one's option, need not be used, and when not used, does not occupy storage space in the automobile. With the invention, a windshield protection apparatus is provided which dispenses an ice melting liquid underneath the protective device. With the invention, a windshield protection apparatus is provided which distributes the de-icing composition evenly over the windshield.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved windshield protection apparatus, comprising:
   a ground-supported base,
   a height adjusting assembly connected to said ground-supported base,
   a transverse support assembly connected to said height adjusting assembly,
   a windshield-contacting protective member connected to said transverse support assembly, and
   tilt adjustment assembly means, connected to said windshield-contacting protective member, for adjusting a tilt of said windshield-contacting protective member with respect to an automobile windshield.

2. The apparatus described in claim 1 wherein said windshield-contacting protective member includes a contour that is complementary to a contour of the automobile windshield of the automobile.

3. The apparatus described in claim 1 wherein:
   said windshield-contacting protective member is rigidly attached to said transverse support assembly, and
   said transverse support assembly is attached to said height adjusting assembly with a swivel connection.

4. The apparatus described in claim 1 wherein said ground-supported base includes:
   a hollow interior chamber defined by a housing.

5. The apparatus described in claim 4 wherein said housing includes a filler aperture and a cap for said filler aperture.

6. The apparatus described in claim 4 wherein said hollow interior chamber contains a quantity of a ballast material.

7. The apparatus described in claim 1 wherein said ground-supported base includes:
   a receiving portion for receiving said height adjusting assembly.

8. The apparatus described in claim 7 wherein said receiving portion defines a cylindrical well for receiving a complementary cylindrical bottom portion of said height adjusting assembly, such that said height adjusting assembly is capable of adjustably swivelling in said ground-supported base.

9. The apparatus described in claim 7 wherein a bottom portion of said height adjusting assembly includes a plurality of key elements which fit into complementary key-receiving slots in said ground-supported base.

10. The apparatus described in claim 1 wherein said height adjusting assembly includes:
    a first telescopic member supported by said ground-supported base,
    a second telescopic member which is telescopically received in said first telescopic member, said second telescopic member including apertures for receiving said transverse support assembly, said second telescopic member also including a first locking assembly for locking said transverse support assembly and said windshield-contacting protective member at a predetermined tilt, and a second locking assembly for locking said second telescopic member at a predetermined height adjustment with respect to said first telescopic member.

11. The apparatus described in claim 1, further including:
a resilient wiper member connected to a bottom portion of said windshield-contacting protective member, such that said resilient wiper member wipes against a hood of an automobile when the automobile is driven in reverse away from said windshield-contacting protective member, such that said windshield-contacting protective member is capable of scraping some accumulated precipitation off of the hood of the automobile.

12. The apparatus described in claim 1, further including:
a liquid distribution assembly, connected to said windshield-contacting protective member, for distributing a quantity of a liquid onto the automobile windshield.

13. The apparatus described in claim 12 wherein said liquid distribution assembly contains and distributes a quantity of a de-icer solution.

14. The apparatus described in claim 12 wherein said liquid distribution assembly includes:

a liquid distribution element connected to said windshield-contacting protective member at a location near a top of said windshield-contacting protective member and between said windshield-contacting protective member and the automobile windshield, and
a liquid supply assembly for supplying liquid to said liquid distribution element.

15. The apparatus described in claim 14 wherein said liquid distribution element includes a plurality of distribution apertures.

16. The apparatus described in claim 15 wherein said distribution apertures are arranged in a linear array in said liquid distribution element.

17. The apparatus described in claim 14 wherein said liquid supply assembly includes:
a first tank located over said liquid distribution element for supplying liquid to said liquid distribution element by gravity feed,
a hose connected to said first tank, said hose supplying liquid to said first tank, and
a second tank connected to said hose, said second tank supplying liquid to said hose and supplying liquid thereto, wherein said second tank is supported by said height adjusting assembly.

* * * * *